(12) United States Patent
Rehfus et al.

(10) Patent No.: US 9,562,579 B2
(45) Date of Patent: Feb. 7, 2017

(54) VENTED EMA WITH DESICCANT

(71) Applicant: Goodrich Corporation, Charlotte, NC (US)

(72) Inventors: Kevin Rehfus, Troy, OH (US); Harald Klode, Centerville, OH (US); David Drennen, Bellbrook, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 167 days.

(21) Appl. No.: 14/527,319

(22) Filed: Oct. 29, 2014

(65) Prior Publication Data

US 2016/0123417 A1 May 5, 2016

(51) Int. Cl.
| | | |
|---|---|---|
| *F16H 57/027* | (2012.01) | |
| *F16D 65/16* | (2006.01) | |
| *B60T 13/74* | (2006.01) | |
| *F16D 65/00* | (2006.01) | |
| *F16D 65/18* | (2006.01) | |
| *F16D 121/24* | (2012.01) | |
| *F16D 125/40* | (2012.01) | |
| *F16D 127/00* | (2012.01) | |
| *F16D 125/50* | (2012.01) | |

(52) U.S. Cl.
CPC ............ *F16D 65/16* (2013.01); *B60T 13/741* (2013.01); *F16D 65/0025* (2013.01); *F16D 65/18* (2013.01); *F16D 2121/24* (2013.01); *F16D 2125/40* (2013.01); *F16D 2125/50* (2013.01); *F16D 2127/00* (2013.01); *F16H 57/027* (2013.01)

(58) Field of Classification Search
CPC  F16H 57/027; F16D 2121/24; F16D 2125/20; F16D 2125/36; F16D 2125/40

USPC ................................................. 74/89.4, 89.41
See application file for complete search history.

(56) References Cited

U.S. PATENT DOCUMENTS

| 5,126,712 | A | * | 6/1992 | Sugiyama | ............... F02N 15/00 277/636 |
|---|---|---|---|---|---|
| 2007/0193835 | A1 | * | 8/2007 | Wang | ..................... F16D 65/18 188/17 |
| 2008/0135349 | A1 | * | 6/2008 | Himes | ................. F16D 65/0043 188/71.5 |
| 2008/0141803 | A1 | * | 6/2008 | Christensen | ............ F16H 25/20 74/89.4 |

(Continued)

FOREIGN PATENT DOCUMENTS

| DE | 10057912 | 10/2001 |
|---|---|---|
| DE | 10232219 | 4/2003 |

OTHER PUBLICATIONS

Machine translation of DE 10232219 (no date).*
Extended European Search Report dated Apr. 1, 2016 in European Application No. 15191945.3.

*Primary Examiner* — Nicholas J Lane
(74) *Attorney, Agent, or Firm* — Snell & Wilmer L.L.P.

(57) ABSTRACT

A vented EMA may have a vent that allows gas to pass from into and out of the vented EMA, while preventing liquid from passing into and out of the vented EMA. The vented EMA may have a desiccant material inside the vented EMA that absorbs condensation from within the vented EMA. A vented EMA may also have an air flow path that conducts gas into and out of the vent during operation. As a result, the pressure inside the vented EMA may equalize with the pressure outside the vented EMA, but the deleterious ingress of liquids may be ameliorated.

17 Claims, 4 Drawing Sheets

(56) References Cited

U.S. PATENT DOCUMENTS

| | | | |
|---|---|---|---|
| 2008/0271553 A1 | 11/2008 | Wang et al. | |
| 2010/0276233 A1* | 11/2010 | Cahill | B60T 13/741 188/73.47 |
| 2016/0122009 A1* | 5/2016 | Drennen | B64C 25/44 188/156 |

\* cited by examiner

VENTED EMA WITH DESICCANT

FIELD

The present disclosure relates to braking systems and, more specifically, to an electric motor actuator that is vented.

BACKGROUND

Typical electric motor actuators in aircraft and/or large vehicle (e.g., trains, commercial equipment, and/or the like) brake systems may employ an electric motor actuator. In response to the actuator being engaged, the actuator translates a force-exerting member into and out the housing. This translating causes pressure changes in the air volume within the actuator, contributing to moisture ingress, which degrades the actuator operational life and performance.

SUMMARY OF THE INVENTION

A vented EMA is disclosed. The vented EMA may include a motor, a gear train, and a ball screw assembly having a free air volume bounded by the radially inner surface of the ball screw assembly. The motor may drive the gear train, and the gear train may translate the ball screw assembly. The vented EMA may also include a housing forming a structural support member of the vented EMA, a cover forming a cylindrical member into which a portion of the housing is inserted, and a liner having a cylinder section disposed annularly between the motor and the ball screw assembly. The vented EMA may also include a vent having a gas exchange apparatus including a gas permeable-liquid impermeable membrane whereby gas may be drawn into the vented EMA and whereby liquid may be prevented from being drawn into the vented EMA, and an air flow path, whereby the gas may be conducted between the free air volume and the vent.

A method of operating a vented EMA is disclosed. The method of operating a vented EMA may include extending a ball screw assembly from the vented EMA, increasing a volume of a free air volume of the vented EMA in response to the extending, and drawing a gas including a first quantity of water vapor into a vent in response to the increasing. The method may also include absorbing, by a desiccant material, the first quantity of water vapor, evaporating, from the desiccant material, a second quantity of water vapor, and retracting the ball screw assembly into the vented EMA. Moreover, the method may include decreasing the volume of the free air volume of the vented EMA in response to the retracting, and expelling the gas including the second quantity of water vapor from the vent in response to the decreasing.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, phrases such as "make contact with," "coupled to," "touch," "interface with" and "engage" may be used interchangeably.

In various embodiments, a brake system may comprise an electric motor actuator ("EMA"). The EMA may be coupled to or otherwise operate a pressure generating device such as, for example, a ball screw, a ram, and/or the like. In operation, the EMA may cause the pressure generating device to move and/or exert a force on other brake system structures such as, for example, a brake disk stack or pad to exert a stopping force on a wheel or other suitable moving structure. This stopping force may load and/or exert a corresponding force on the EMA structures such as, for example, an EMA housing.

The EMA may traditionally be sealed to help protect the EMA and its internal components from foreign substances, such as water. However, as the pressure generating device moves, the internal volume of the EMA changes. Accordingly, the internal pressure of the EMA changes as well. Moreover, heating and cooling may also cause the internal pressure of the EMA to change. This change in pressure may encourage foreign substances, such as water, to breach the EMA's seals and ingress into the EMA. Over time, the ingressed foreign substances may damage the EMA.

Various solutions to this limitation of traditional EMAs are presented below.

Figure 1:
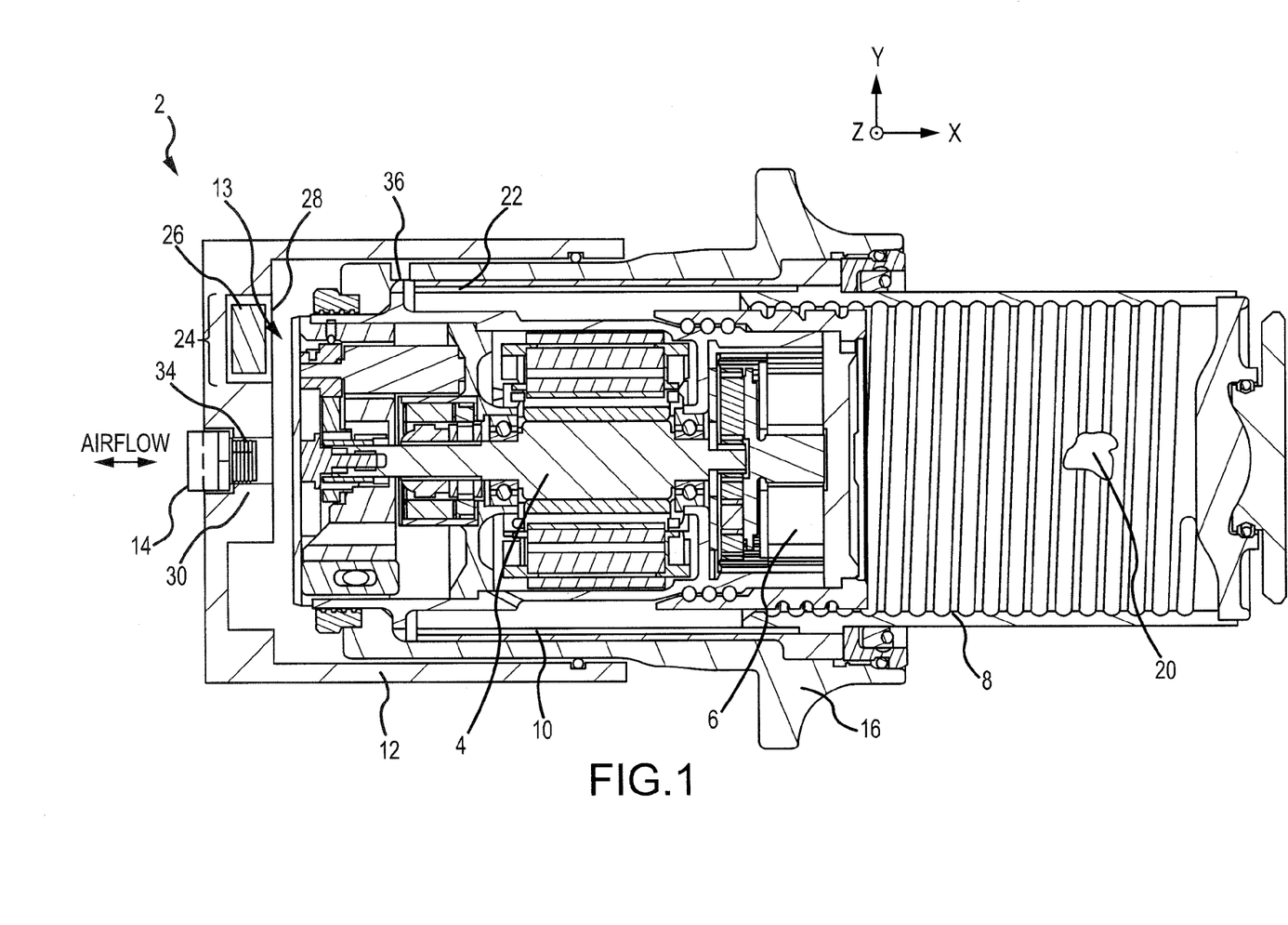
FIG. 1 illustrates a cross-sectional view of an example vented EMA, in accordance with various embodiments.

With reference to FIG. 1, a vented EMA 2 is illustrated. A vented EMA 2 comprises a motor 4, a gear train 6, and a ball screw assembly 8. The motor 4 drives the gear train 6 in order to translate the ball screw assembly 8. In response to this translating, the ball screw assembly 8 exerts pressure, such as on a brake stack, or another device desired to be acted upon.

Figure 3:
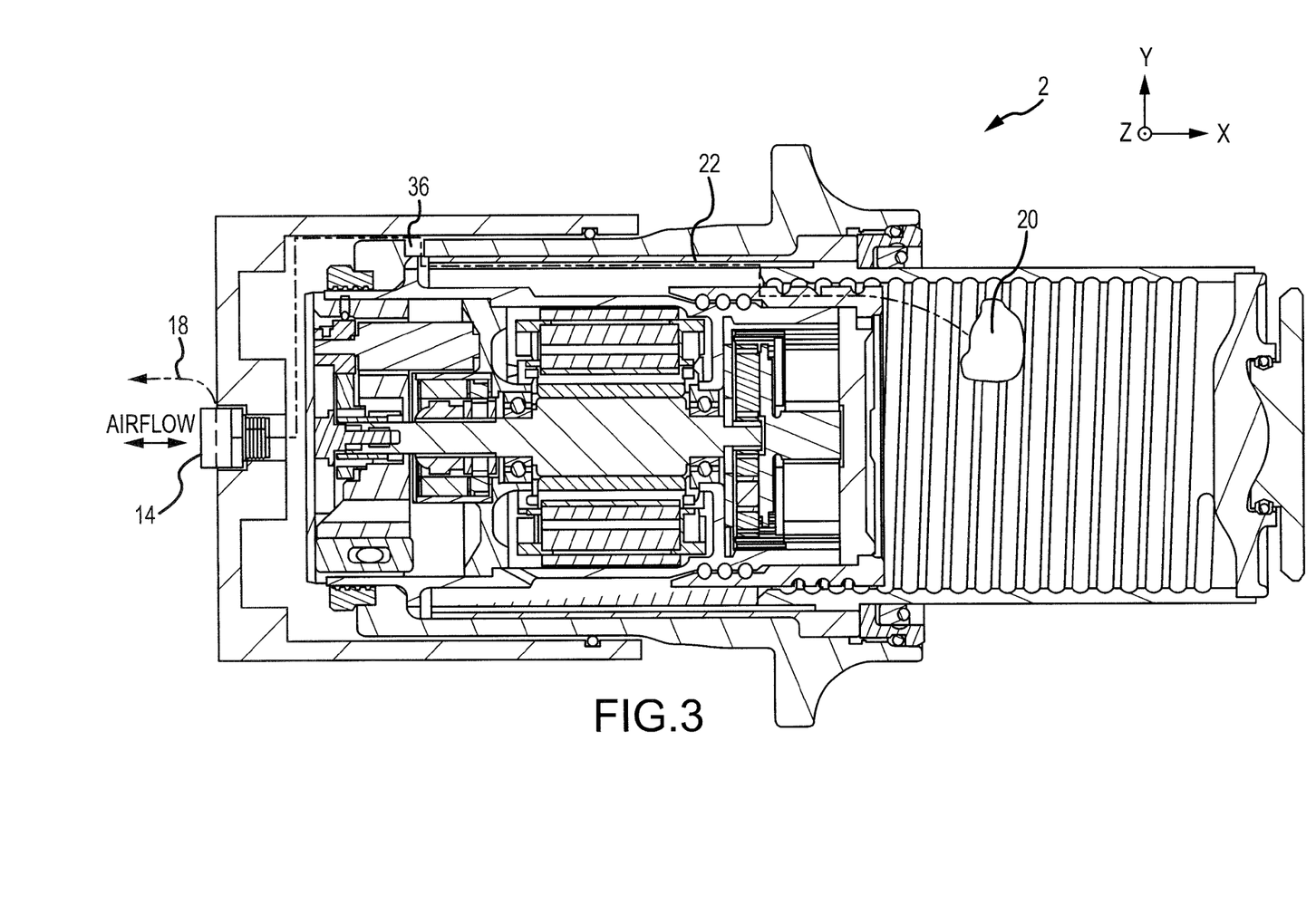
FIG. 3 illustrates an air flow path of an example vented EMA, in accordance with various embodiments.

The vented EMA 2 may further comprise a liner 10, a cover 12, a vent 14, and a housing 16. With reference to FIG. 3, the vented EMA 2 may further comprise an air flow path 18, which permits air to flow into and out the vented EMA 2 via the vent 14.

With renewed reference to FIG. 1, the vented EMA 2 may comprise a housing 16. The housing 16 may comprise a structural support member, such as a member whereby the vented EMA 2 may be attached to surrounding structures, such as an aircraft static structure, for example, a brake assembly. The housing 16 may comprise a cylindrical member having an internal space wherein different components, such as the motor 4, the gear train 6, and the ball screw assembly 8 may be at least partially disposed.

The vented EMA 2 may further comprise a cover 12. The cover 12 may connect to the housing 16, and may protect the different components disposed within the housing 16 from exposure to the external environment. For example, the cover 12 may comprise a cylindrical member with an open end into which a portion of the housing 16 may be inserted. Thus, in various embodiments, the cover 12 has an inner diameter greater than the outer diameter of the housing 16, so that the housing 16 extends axially into the cover 12.

The vented EMA 2 may further comprise a liner 10. The liner 10 may comprise an cylinder section, open on both ends, and having an outer diameter less than an inner diameter of the housing 16, and having an inner diameter greater than an outer diameter of the motor 4. In this manner, the liner 10 encircles at least a portion of the motor 4. The liner 10 may provide a barrier between the motor 4 and the ball screw assembly 8. For example, when retracted (as discussed below) the ball screw assembly 8 may annularly encircle a portion of the motor 4. The liner 10 may be disposed annularly between the motor 4 and the ball screw assembly 8, and may protect the motor 4 from contact with grease and/or lubricant, such as that applied to the ball screw assembly 8 to ameliorate friction.

With continuing reference to FIG. 1, the motor 4 may comprise a brushless electrical motor. In further embodiments, the motor 4 may comprise a brushed electrical motor. However, the motor 4 may comprise a hydraulic actuator, or a pneumatic actuator, or any other apparatus whereby motive energy may be imparted to, for example, gear train 6.

The gear train 6 comprises one or more gears disposed between the motor 4 and the ball screw assembly 8, whereby the ball screw assembly 8 is operatively connected to the motor 4 and enabled to translate in response to motive energy imparted by the motor 4. In various embodiments, the gear train 6 comprises a speed reduction drive. In this manner, the gear train 6 may receive a low-torque, high speed motive input, and may output a high-torque, low speed motive output, thus driving the ball screw assembly 8. However, any gear train 6 with any desired characteristics may be implemented. For example, in embodiments wherein the motor 4 comprises a hydraulic actuator, the gear train 6 may comprise a direct mechanical interconnection between the motor 4 and the ball screw assembly 8, with no gear reduction, although any arrangement may be contemplated.

The ball screw assembly 8 may comprise any pressure exerting apparatus, whereby motive energy imparted by the motor 4 through the gear train 6 may be conveyed to another device or system, such as a brake stack. In various embodiments, the ball screw assembly 8 is configured to convert rotary motion into linear motion. In further embodiments, the ball screw assembly 8 comprises a hydraulically actuated ram, although any desired configuration may be implemented.

Thus, one may appreciate that as the ball screw assembly 8 translates, the internal volume of the vented EMA 2 may change as well. For example, the ball screw assembly 8 may translate outwardly away from the housing 16 along a central axis of the housing (e.g., the X-axis as depicted in FIG. 1) (e.g., "extension"), so that the volume of the vented EMA 2 increases as the ball screw assembly 8 moves out the internal volume of the vented EMA 2. FIG. 1 illustrates the ball screw assembly 8 at full extension. Also, the ball screw assembly 8 may translate inward along a central axis of the housing (e.g., the X-axis as depicted in FIG. 1) (e.g., "retraction"), so that the volume of the vented EMA 2 decreases as the ball screw assembly 8 is received back into the housing 16 of the vented EMA 2.

As such, the ball screw assembly 8 may comprise a free air volume 20. The free air volume 20 may be bounded by the radially inner surface of the ball screw assembly 8. The free air volume 20 may be disposed within the ball screw assembly 8 and may increase and decrease in response to the extension and retraction of the ball screw assembly 8.

As the free air volume 20 changes, the gas within the vented EMA 2 may undergo fluid flow. Because a vent 14 (discussed herein) is provided, the gas may be expelled from, or drawn in through the vent 14 in response to the pressure and/or suction caused by the change in free air volume 20.

Accordingly, the vented EMA 2 may comprise various additional features whereby the fluid flow of the gas may be facilitated, among other features.

Figure 2:
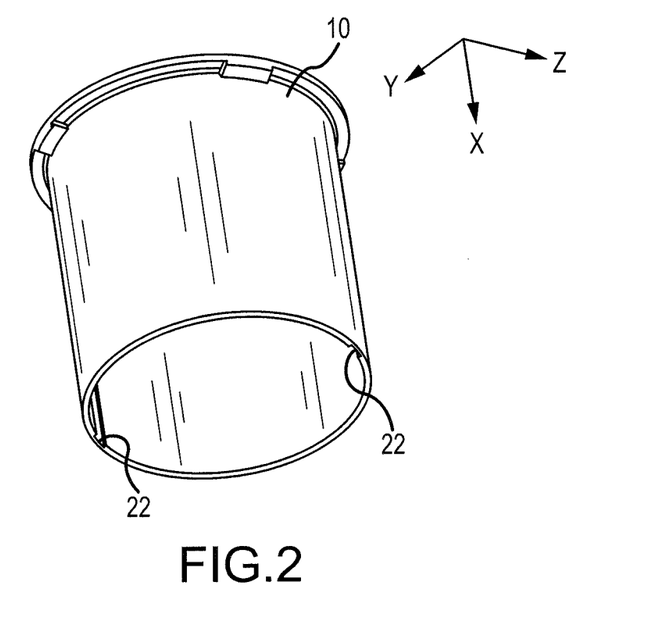
FIG. 2 illustrates various features of an example liner of a vented EMA, in accordance with various embodiments.

Having discussed various aspects of the vented EMA 2, with continuing reference to FIG. 1, and with additional reference to FIG. 2, the liner 10 may comprise orifice air channels 22. Orifice air channels 22 may comprise grooves extending axially along a central axis of the liner (e.g., the X-axis as depicted in FIGS. 1 and 2) along the inner surface of the liner 10. As the size of the free air volume 20 changes, gas may be expelled from or drawn into the free air volume 20 via the orifice air channels 22. In various embodiments, the orifice air channels 22 comprise anti-rotation keying grooves, whereby the liner 10 is prevented from unwanted rotation, such as under the influence of the ball screw assembly 8. The orifice air channels 22 may comprise any structure whereby gas may be fluidically conducted into and out the free air volume 20.

In various embodiments, the orifice air channels 22 transit the entire axial length of the liner 10 (e.g., the X-axis as depicted in FIG. 2). The orifice air channels 22 may further be in fluidic communication with orifice holes 36 of the housing 16, as discussed below.

The housing 16 may comprise orifice holes 36. Orifice holes 36 may comprise apertures extending radially through the housing 16 whereby fluid may be conducted from the inner circumferential face of the housing 16 to the outer circumferential face of the housing 16. The housing 16 may comprise a plurality of orifice holes 36 spaced circumferentially about the housing 16. However, in further embodiments, the housing 16 may comprise a single orifice hole 36. Thus, as one may appreciate, the housing 16 may comprise any number of orifice holes 36, as desired, to conduct a desired volume of gas at a desired flow rate and/or pressure. The orifice holes 36 may be disposed proximate to one end of the housing 16, for example, the negative-X most end of the housing, along the X axis depicted in FIGS. 1-3 (e.g., the end of the housing disposed within the cover 12). The orifice holes 36 may be arranged circumferentially around housing 16, although any desired arrangement may also be selected. The orifice holes 36 may be disposed in a portion of the housing 16 within the cover 12. Thus, the orifice holes 36 may conduct gas from the orifice air channels 22 to the cover air space 13.

The cover 12 may comprise a cover air space 13. The cover air space 13 may comprise a volume of space within the cover 12 bounded by the radially inner surface of the cover 12. The cover air space may fluidically connect between the orifice holes 36 and at least one of a vent 14 or a desiccant material 26. However, the cover air space 13 may comprise any feature whereby gas from the orifice air channels 22 may flow to/from at least one of the vent 14 or the desiccant material 26.

Having discussed various features of the vented EMA 2 whereby the fluid flow of gas may be facilitated, attention is directed to FIG. 3, whereby an example flow path of gas is illustrated. An air flow path 18 may comprise any path whereby gas may be conducted between the free air volume 20 and the vent 14. In various embodiments, the air flow path 18 comprises a route terminating at the free air volume 20, extending annularly outward of the motor 4 (e.g., radially away from a central axis of the housing such as the X-axis as depicted in FIG. 1), through an orifice air channel 22, extending axially away from the free air volume 20 (e.g., axially parallel to a central axis of the housing such as the X-axis as depicted in FIG. 1) to one or more orifice hole 36 disposed in the housing 16, extending annually outward (e.g., radially away from a central axis of the housing such as the X-axis as depicted in FIG. 1) of the housing 16 and conducted annularly inward (e.g., radially toward a central axis of the housing such as the X-axis as depicted in FIG. 1) of the cover 12 through a cover air space 13, and finally conducted to a vent 14. In various embodiments, the air flow path 18 is further in fluidic communication with a desiccant material 26 (with momentary reference to FIG. 1).

With reference now to FIGS. 1 and 3, various aspects of the cover 12 are explicated in further detail. In various embodiments, the cover 12 may comprise a cover channel 24. A desiccant material 26 may be disposed within the cover channel 24, and may be retained in position by a desiccant retainer 28.

A cover channel 24 may comprise an annular groove cut in the cover 12, wherein a desiccant may be disposed. In further embodiments, the cover channel 24 may not comprise an annulus, but may comprise a channel, depression, or cavity of any shape, for example, a cylindrical depression, a trapezoidal cutout, or any other shape wherein a desiccant may be retained. In still further embodiments, the cover 12 does not have a cover channel 24, and instead a desiccant is affixed to an internal face of the cover 12. However, one may appreciate that a cover channel 24 may comprise any shape or arrangement whereby a desiccant may be retained in position.

A desiccant retainer 28 may comprise a gas permeable membrane disposed over a desiccant material 26 positioned in the cover channel 24, so that the desiccant material 26 does not escape the cover channel 24 during operation, but so that gas traveling along the air flow path 18 (FIG. 3) may contact the desiccant material 26. A desiccant retainer 28 may comprise an annular ring inserted into a portion of a cover channel 24. Furthermore, a desiccant retainer 28 may comprise glue, detents, fasteners or any other mechanism whereby a desiccant material 26 may be retained in the cover channel 24.

Finally, as mentioned above, a desiccant material 26 may be disposed in the cover channel 24. A desiccant material 26 may comprise any material whereby liquid water and/or or other desired fluids may be absorbed/adsorbed and retained. In various embodiments, the desiccant material 26 is capable of being dried, for example, as the vented EMA 2 warms during operation, the desiccant material 26 may be warmed so that retained liquid evaporates as a vapor, and is subsequently carried away along air flow path 18 (FIG. 3).

A cover 12 may also comprise a vent 14. The cover 12 may comprise a vent receiver 30, whereby the vent 14 is retained in connection to the cover 12. The vent 14 may comprise a vent-cover affixment member 34 that interfaces with the vent receiver 30, thereby holding the vent 14 in position.

For example, the cover 12 may comprise a vent receiver 30. A vent receiver 30 may comprise an aperture disposed in a face of the cover 12 and extending through the cover 12. In further embodiments, the vent receiver 30 comprises threads.

The vent 14 may comprise a vent-cover affixment member 34. The vent-cover affixment member 34 may be configured to interface with the vent receiver 30 in order to hold the vent 14 in position. In various embodiments wherein the vent receiver 30 comprises threads, the vent-cover affixment member 34 may comprise corresponding threads, such as on a shaft, thus resembling a bolt, whereby the vent 14 may be screwed into the vent receiver 30 and retained. In further embodiments, wherein the vent receiver 30 comprises an aperture disposed in a face of the cover 12 and extending through the cover 12, but not having threads, the vent-cover affixment member 34 may comprise a threaded shaft configured to receive a nut, whereby the vent 14 may be retained in connection to the cover 12.

Finally, the vent 14 may comprise a gas exchange apparatus whereby gas and/or vapor is permitted to travel from the cover air space 13, through the vent 14 and out or into the vented EMA 2. However, the gas exchange apparatus may further be configured to prevent the ingress or egress of liquid from the vented EMA 2. In various embodiments, the vent 14 comprises an expanded polytetrafluoroethylene ("ePTFE") material. However, the vent 14 may comprise any gas exchange apparatus that is gas permeable, but liquid impermeable. As such, the vent may comprise a gas permeable-liquid impermeable membrane. For instance, the vent 14 may comprise a material with pores approximately 700 times larger than an air molecule, but about 20,000 smaller than a typical water droplet, thus serving as a gas permeable barrier against water, dirt, and debris. In this manner, the vent 14 may permit the pressure of the gas within the free air volume 20 to equalize with the pressure of the ambient environment, but prevent the transfer of liquid into or out the internal area of the vented EMA 2.

Liquid that has condensed inside the vented EMA 2 may be absorbed by the desiccant, until heat causes the liquid to evaporate, whereupon it may be conveyed as vapor through the vent 14 and escape the vented EMA 2. In this manner, the vented EMA 2 may be permitted to exchange gas with the external environment so as to equalize pressure, yet may be protected from liquid ingress, such as the infiltration of water and subsequent degradation of performance that may occur.

Figure 4:
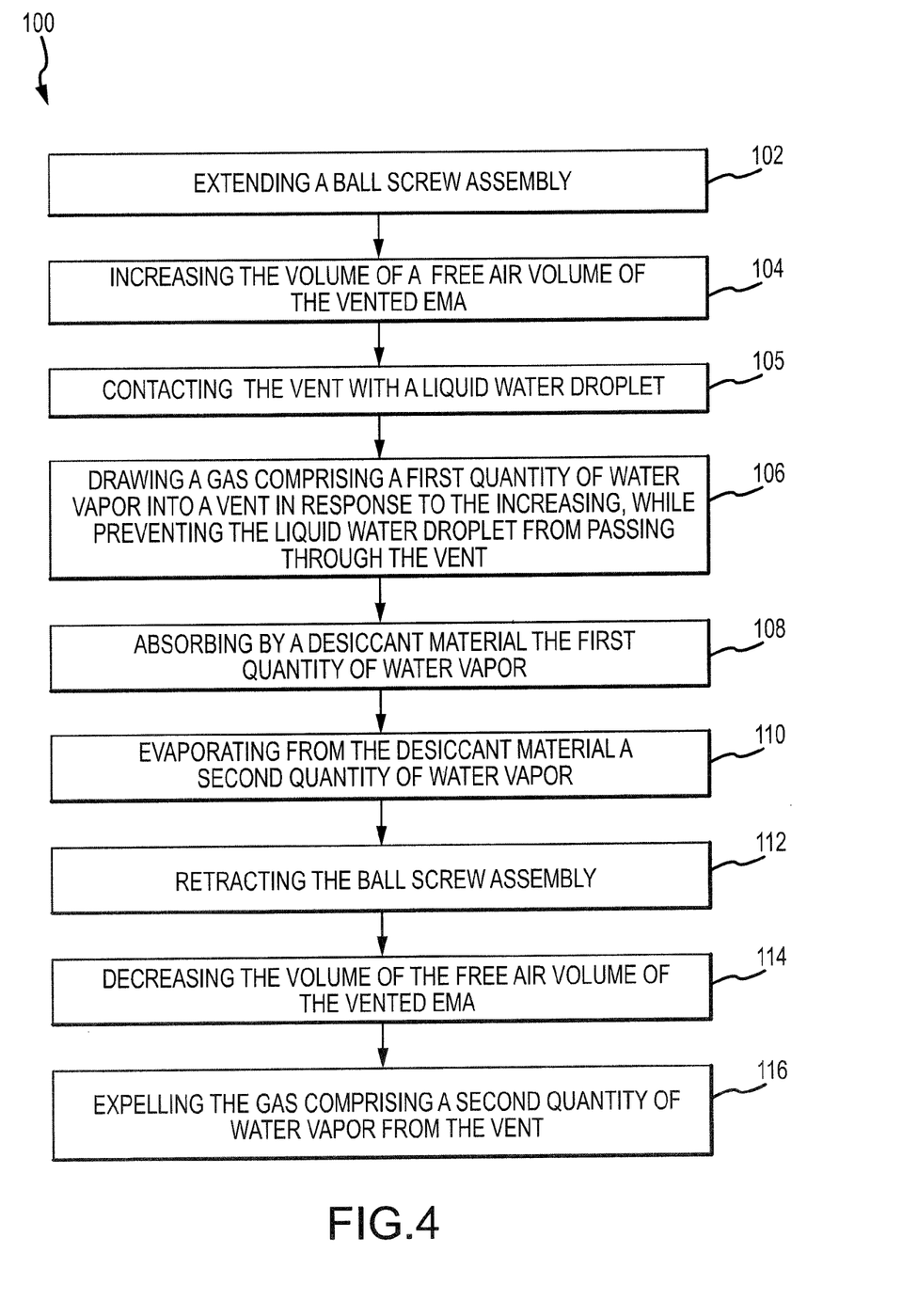
FIG. 4 illustrates an example method of operating a vented EMA, in accordance with various embodiments.

Having discussed various aspects of a vented EMA 2, a method 100 of operating a vented EMA 2 is presented. With reference to FIGS. 1 and 4, a method of operating a vented EMA 2 may comprise extending a ball screw assembly 8 from a vented EMA (Step 102). The ball screw assembly 8 may translate away from the housing 16 along a central axis of the housing (e.g., the X-axis as depicted in FIG. 1) (e.g., "extension"). A free air volume 20 of the vented EMA 2 may be increased in response to the extending. (Step 104). A liquid water droplet may come into contact with the vent 14. (Step 105). A gas comprising a first quantity of water vapor may be drawn into a vent 14 in response to the increasing while the liquid water drop may be prevented from passing through the vent 14 (Step 106). The first quantity of water vapor may condense inside the vented EMA 2 and may be absorbed by the desiccant material 26 (Step 108). Subsequently, a second quantity of water vapor may evaporate from the desiccant material 26. (Step 110). The ball screw assembly 8 may retract into a vented EMA (Step 112). The ball screw assembly 8 may translate inward along a central axis of the housing (e.g., the X-axis as depicted in FIG. 1) (e.g., "retraction"), so that the volume of the vented EMA 2 decreases as the ball screw assembly 8 is received back into the housing 16 of the vented EMA 2. Thus, in response to the retracting, the free air volume 20 of the vented EMA 2 may be decreased. (Step 114). Consequently, a gas comprising a second quantity of water vapor may be expelled from the vent 14 in response to the decreasing (Step 116). In various embodiments, the second quantity of water vapor may be equal to the first quantity of water vapor, although in further embodiments it may be lesser, or may be greater.

In various embodiments, the vented EMAs described herein provide improved reliability as compared to prior EMAs because the parts are not subject to pressure differentials with the outside environment, which may degrade seals, and because the parts are not subject to infiltration by liquid contaminants, such as water. Furthermore, the instrumented housings described herein provide improved performance because component degradation over time is ameliorated.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover 12 a non-exclusive inclusion, such that a process, method, article, or apparatus that comprises a list of elements does not include only those elements but may include other elements not expressly listed or inherent to such process, method, article, or apparatus.

What is claimed is:

1. A vented EMA comprising:
   a motor;
   a gear train;
   a ball screw assembly comprising a free air volume bounded by the radially inner surface of the ball screw assembly,
      wherein the motor drives the gear train,
      whereby the gear train translates the ball screw assembly;
   a housing comprising a structural support member of the vented EMA;
   a cover comprising a cylindrical member into which a portion of the housing is inserted;
   a liner comprising a cylinder section disposed annularly between the housing and the ball screw assembly; and
   a vent comprising a gas exchange apparatus comprising a gas permeable-liquid impermeable membrane whereby gas may be drawn into the vented EMA and whereby liquid may be prevented from being drawn into the vented EMA; and
   an air flow path, whereby the gas may be conducted between the free air volume and the vent, wherein the cover comprises:
      a cover channel comprising an annular groove wherein a desiccant material is inserted;
      a desiccant retainer whereby the desiccant material is retained in the cover channel.

2. The vented EMA according to claim 1, wherein the vent comprises expanded polytetrafluoroethylene.

3. The vented EMA according to claim 1, wherein the motor comprises an electric motor and wherein the gear train comprises a speed reduction drive.

4. The vented EMA according to claim 1, further comprising:
   the desiccant material disposed inside the vented EMA whereby fluid may be absorbed from within the vented EMA, and
   wherein the air flow path is further in fluidic communication with the desiccant material.

5. The vented EMA according to claim 1, wherein the liner comprises an orifice air channel in fluid communication with the free air volume.

6. The vented EMA according to claim 1,
   wherein the cover comprises:
      a cover channel comprising an annular groove wherein the desiccant material is inserted;
      a desiccant retainer whereby the desiccant material is retained in the cover channel, and
   wherein the liner comprises:
      an orifice air channel in fluid communication with the free air volume.

7. The vented EMA according to claim 6, wherein the housing comprises an orifice hole in fluid communication with the orifice air channel.

8. The vented EMA according to claim 7, wherein the cover comprises a cover air space in fluid communication with the orifice hole and further in fluid communication with the vent.

9. The vented EMA according to claim 8,
wherein the cover comprises a vent receiver comprising an aperture disposed in the cover and having threads;
wherein the vent comprises a vent-cover affixment member comprising affixment member threads corresponding to the threads of the vent receiver, whereby the vent may be retained in connection with the cover.

10. The vented EMA according to claim 8, wherein the air flow path comprises a fluid passage from the free air volume, extending annularly outward of the motor through the orifice air channel, extending axially along the orifice air channel to the orifice hole disposed in the housing, extending annually outward of the housing through the orifice hole, and extending annularly inward of the cover through the cover air space in fluid communication with the vent.

11. The vented EMA according to claim 1, wherein the desiccant retainer comprises an annular ring inserted into a portion of the cover channel.

12. The vented EMA according to claim 1, wherein the desiccant retainer comprises glue.

13. A vented EMA comprising:
a motor;
a gear train;
a ball screw assembly comprising a free air volume bounded by the radially inner surface of the ball screw assembly,
wherein the motor drives the gear train,
whereby the gear train translates the ball screw assembly;
a housing comprising a structural support member of the vented EMA;
a cover comprising a cylindrical member into which a portion of the housing is inserted;
a liner comprising a cylinder section disposed annularly between the housing and the ball screw assembly; and
a vent comprising a gas exchange apparatus comprising a gas permeable-liquid impermeable membrane whereby gas may be drawn into the vented EMA and whereby liquid may be prevented from being drawn into the vented EMA; and
an air flow path, whereby the gas may be conducted between the free air volume and the vent,
wherein the cover comprises:
a cover channel comprising an annular groove wherein a desiccant material is inserted;
a desiccant retainer whereby the desiccant material is retained in the cover channel, and
wherein the liner comprises:
an orifice air channel in fluid communication with the free air volume.

14. The vented EMA according to claim 13, wherein the housing comprises an orifice hole in fluid communication with the orifice air channel.

15. The vented EMA according to claim 14, wherein the cover comprises a cover air space in fluid communication with the orifice hole and further in fluid communication with the vent.

16. The vented EMA according to claim 15,
wherein the cover comprises a vent receiver comprising an aperture disposed in the cover and having threads;
wherein the vent comprises a vent-cover affixment member comprising affixment member threads corresponding to the threads of the vent receiver, whereby the vent may be retained in connection with the cover.

17. The vented EMA according to claim 15, wherein the air flow path comprises a fluid passage from the free air volume, extending annularly outward of the motor through the orifice air channel, extending axially along the orifice air channel to the orifice hole disposed in the housing, extending annually outward of the housing through the orifice hole, and extending annularly inward of the cover through the cover air space in fluid communication with the vent.

* * * * *